United States Patent [19]

Gurstein et al.

[11] Patent Number: 5,229,908
[45] Date of Patent: Jul. 20, 1993

[54] MULTIPLE CIRCUIT OVERLOAD PROTECTION DEVICE

[75] Inventors: Bernard Gurstein, Hayden Lake; Russell Gurstein, Hayden, both of Id.

[73] Assignee: U.S. Products, Inc., Hayden Lake, Id.

[21] Appl. No.: 690,419

[22] Filed: Apr. 24, 1991

[51] Int. Cl.$^5$ .......... H02H 3/18; H02H 3/26; H02H 3/42

[52] U.S. Cl. .......... 361/85; 307/511; 307/39; 307/11

[58] Field of Search .......... 361/85, 47, 76; 307/471, 479, 511, 592, 127, 130, 86, 39, 34, 38, 11; 324/521, 86; 340/825.7, 658; 323/910

[56] References Cited

U.S. PATENT DOCUMENTS

| | | |
|---|---|---|
| 3,944,891 | 3/1976 | McDonald et al. .......... 361/77 |
| 4,451,823 | 5/1984 | Penn et al. .......... 340/658 |
| 4,528,456 | 7/1985 | Harris .......... 307/38 |
| 4,532,569 | 7/1985 | Salcedo .......... 361/76 |
| 4,695,738 | 9/1987 | Wilmot .......... 307/39 |
| 4,743,864 | 5/1988 | Nakagawa et al. .......... 307/14 |
| 4,915,162 | 4/1990 | Ikura .......... 307/38 |

FOREIGN PATENT DOCUMENTS 2215536 9/1989 United Kingdom .

Primary Examiner—Steven L. Stephan
Assistant Examiner—E. To
Attorney, Agent, or Firm—Browdy and Neimark

[57] ABSTRACT

A sensor connected to two different phases of an electrical wiring system provides positive protection against overloading of any single phase by preventing operation of one circuit load when there is no phase difference between the wiring circuits.

13 Claims, 3 Drawing Sheets

MULTIPLE CIRCUIT OVERLOAD PROTECTION DEVICE

BACKGROUND OF THE INVENTION

1. Field of the Invention

In three-wire electrical load systems of the type normally used in residential wiring, it is desirable to avoid blowing fuses or tripping circuit breakers by applying excessive loads to a single branch circuit. This invention senses different circuit phases and prevents overloading any one circuit in a multi-phase system. This invention does not provide fault protection.

2. The Prior Art

U.S. Pat. No. 4,532,569 Salcedo shows a relay 12 connected across opposite phases of a 125-250 volt service line. The coil of a relay 27 senses the voltage across the two power lines. The apparatus through the relay detects the voltage difference between the power signals carried on the two wires which carries positive and negative power signals. When the proper voltage is detected, relay contactor 25 closes, connecting the power to various loads. In this device, the contactor 55 switches the +125 volt, the −125 volt, and neutral lines in and out of the circuit simultaneously. There is no concern for or provision for prevention for overload in either the +125 volt or the −125 volt line.

U.S. Pat. No. 3,944,891 McDonald et al discloses a circuit for interconnecting a load only when voltage conditions from the system are appropriate. There is a logic circuit which includes a means for providing ground fault protection. This reference utilizes a logic circuit including a switching means for interrupting current flow and utilizes a polarity response means for synchronizing conductivity to the switch means when conditions of opposite voltage polarity are in the lines L1 and L2 relative to the line neutral.

SUMMARY OF THE INVENTION

This invention provides for sensing voltage phase between two different supply circuits and allows connection of a load to one circuit when a phase difference exists between the two supply circuits. If the circuit is a conventional two phase 120/240 volt residential system, the sensing circuit when connected across the +120 volts and the −120 volts senses the phase difference.

In this invention, applicant provides for sensing of the difference in phase in two different lines by means of an exclusive OR gate which receives as inputs voltages derived from first and second input lines. The output of the exclusive OR gate is then used to switch a contactor for placing a second load on one of said supply lines only when said supply lines are out of phase.

This invention also provides an indicator light which is on when said voltages are out of phase and when a sensing circuit by pass switch is simultaneously closed.

It is an object of this invention to prevent overloading of a single circuit breaker or single fuse by placing too much of a demand on a circuit.

It is a further object of this invention to detect different voltage phases in a three or more wire electrical system.

It is another object of this invention to prevent the unnecessary burning out of electrical system fuses.

Additionally, a further object of this invention is to provide balanced loading between each supply and neutral in a three-wire system.

Further, another object of this invention is to provide a system where the voltage difference between phases of a 120/208 three-phase system is sensed.

DESCRIPTION OF THE PREFERRED EMBODIMENT

Figure 1:
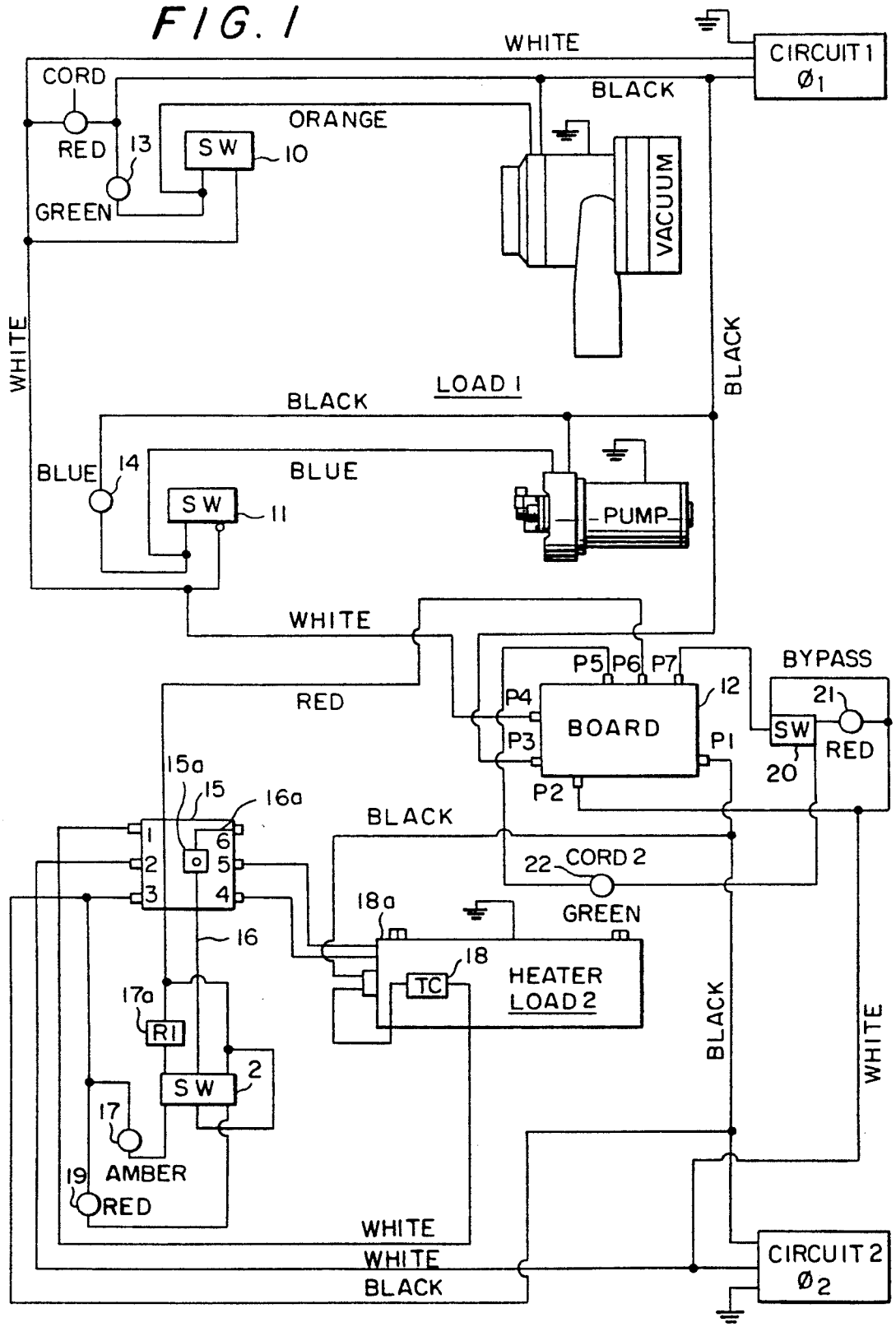
In FIG. 1, there is shown an overall wiring diagram of two separate phase supply lines and loading of one of the lines which is controlled by a phase sensor.

In FIG. 1 the connection, or the loads to circuit 1 ($\phi_1$) and circuit 2 ($\phi_2$) may be by any suitable for means for connection. The preferred means for connection to each circuit is a three-prong plug of the type normally used for 120 volt outlets in residential wiring. In this type of outlet and plug, the neutral wire (white) and the supply wire (black) are polarized so that when the plug is inserted into the socket it is known which lead is connected to neutral and which is connected is connected to the circuit positive supply wire.

In an electrical system having two or more phases which supply different outlets, it is known that each single phase circuit has its own separate circuit breaker or fuse. Therefore, it is known that when circuits of different phases are plugged into, that they are connected to different fuses. In systems where more than one circuit from a single phase is present, the sensing circuit will prevent placing a second load in service when the plugs are inserted into two different circuits both of which are of the same phase, even though they have separate fuses. Therefore, in accordance with this invention there must be multiple phases present at different outlets which are located in the same area.

This invention is to be used where it is known that the current demand of load number 1 plus the current demand of load number 2 exceeds the rating of either circuit number 1 or circuit number 2. When this condition exists, connecting both load number 1 and load number 2 to circuit number 1 will result in opening of the circuit breaker or blowing of the fuse for circuit number 1. Therefore, in order to avoid blowing of fuses or opening of circuit breakers it is necessary that the loads not be both connected until the condition exists where the supply lines are out of phase. In this invention, applicant provides for control of an on-off controller by a sensing circuit which will a turn on the heater load only when the voltages are out of phase.

In FIG. 1, there is shown in the upper portion a load 1 which comprises a vacuum blower and a pump. The vacuum blower and pump are shown connected to the phase 1 circuit by switches 10 and 11. Also connected to phase 1 is the phase sensing board 12 which receives its operating power from phase 1 at inputs p4 and p3. Since load 1 is connected by manual switches, it is contemplated that load 1 will first be placed into service by closing switches 10 and 11. This also provides for illumination of lights 13 and 14 which indicate the load 1 operating condition.

Once load number 1 is placed in service, this invention provides that load number 2 (heater) will not be connected unless the circuit 2 is out of phase with the circuit 1.

The circuit 2 is connected to the heater or load number 2 by means of an on-off controller 15. The controller 15 is controlled by series resistors 17a, 15a, and 18a. 18a is the resistance of the head sensor in load 2 (Heater), 15a is an adjustable resistor, and 17a is a fixed resistor which is switched in and out of the series.

Switch number 2 (double pull, double throw) when in the low heat position (solid lines) provides a connection between the amber light 17 and the pin p6 of circuit board 12. (See FIG. 3). Therefore, if p6 is at ground, the amber light 17 is turned on. When in this state, the series resistors 15a, 17a and 18a connect pin p6 to controller 15.

Figure 3:
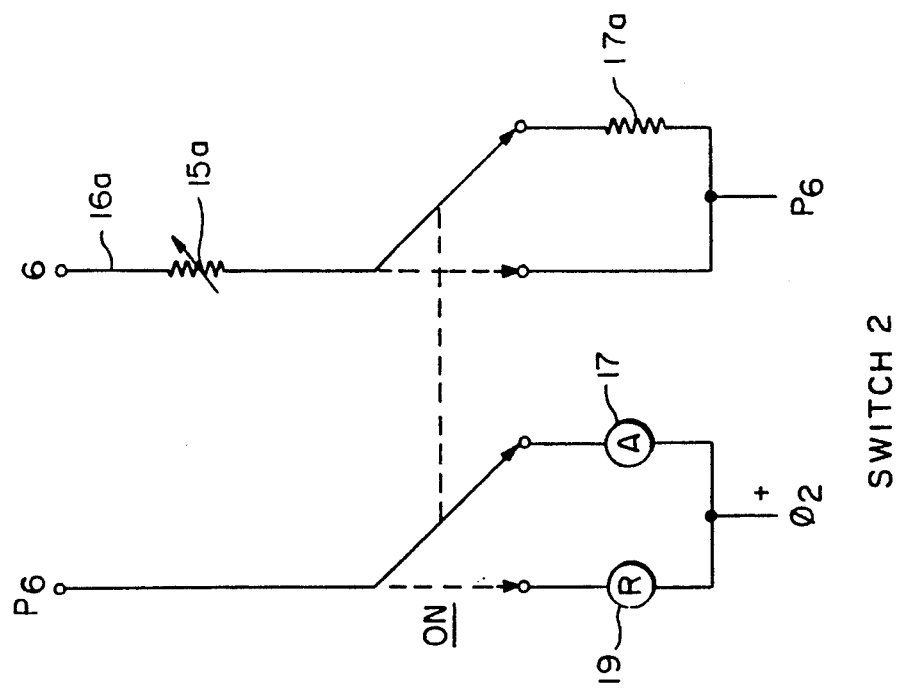
FIG. 3, is a diagram of switch 2.

When the switch 2 is turned to the on state (dash lines), the red light 19 is turned on and the series resistor 17a is by-passed by switch 2 (FIG. 3). The indicator light 19 is turned on to indicate that high heating is occurring at load 2.

The controller 15 is a thermistor sensing control circuit manufactured by solid state advance controls (SSAC) number TCR 4-C. The address for solid state advance controls is P.O. Box 1000, Baldwinsville, N.Y. 10327. The controller 15 shown in FIG. 1 bears input labelled as 1-6. Connected to inputs 4 and 5, is a thermistor 18a located at the heater (load 2). Terminal 6 is connected to potentiometer 15a at switch number 2. The variable resistance and potentiometer 15 and the switchable resistor 17a provides for control of the temperature set point of the thermistor 18a. In controller 15, when the thermistor resistance is high (above the set point), the output to the heater is ON. When the resistance falls to a set point or below, the output turns OFF. The output of controller 15 is at terminal 1 of controller 15. The controller 15 is turned on when contact is made between controller terminals 1 and 2. The connection to controller terminal 3 is power for the device which in this case is derived from circuit number 2 as shown.

Also as shown in FIG. 1, the lead light 19 and the amber light 17 are used to indicate the operation of controller 15 in response to the signal received from the printer circuit board terminal p6. When terminal p6 is at ground, either the amber or the lead light will operate. (See FIG. 3). In one configuration, amber light 17 is turned on when the switch 2 places resistor 17a in series with the connection for potentiometer 15 to pin 6 of the printed circuit board.

Figure 4:
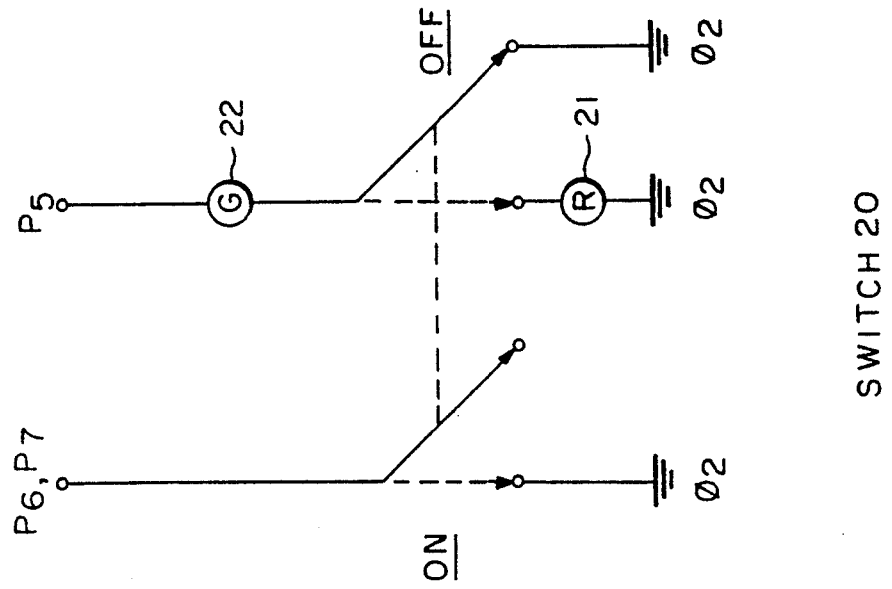
FIG. 4, is a diagram of switch 1.

A by pass switch 20 (FIG. 4) is provided for the purpose of permitting operation of both load number 1 and 2 even though the circuits are not out of phase. Switch 20 has a first contact connected to pins p6 and p7 (which are connected together) at the circuit board 12. Therefore, contact of pin p7 to phase 2 ground will immediately permit the controller 15 to turn on when switch number 20 is in either position). The by pass switch 20 therefore provides a direct connection of pin p6 of board 12 to ground without consideration of the operation of control circuit board 12. The by pass switch 20 is associated with a red indicator light 21 which is used to indicate when out of phase voltages are present when the by pass switch is simultaneously closed. A voltage from pin p5 of circuit board 12 provides the voltage for indicator light 21. Switch 20 is a double throw double pull switch as shown in FIG. 4. A second indicator light 22 (green) is on whenever voltage is present at p5 of the board 12. This occurs whenever transistor 50 is on (out of phase).

Figure 2:
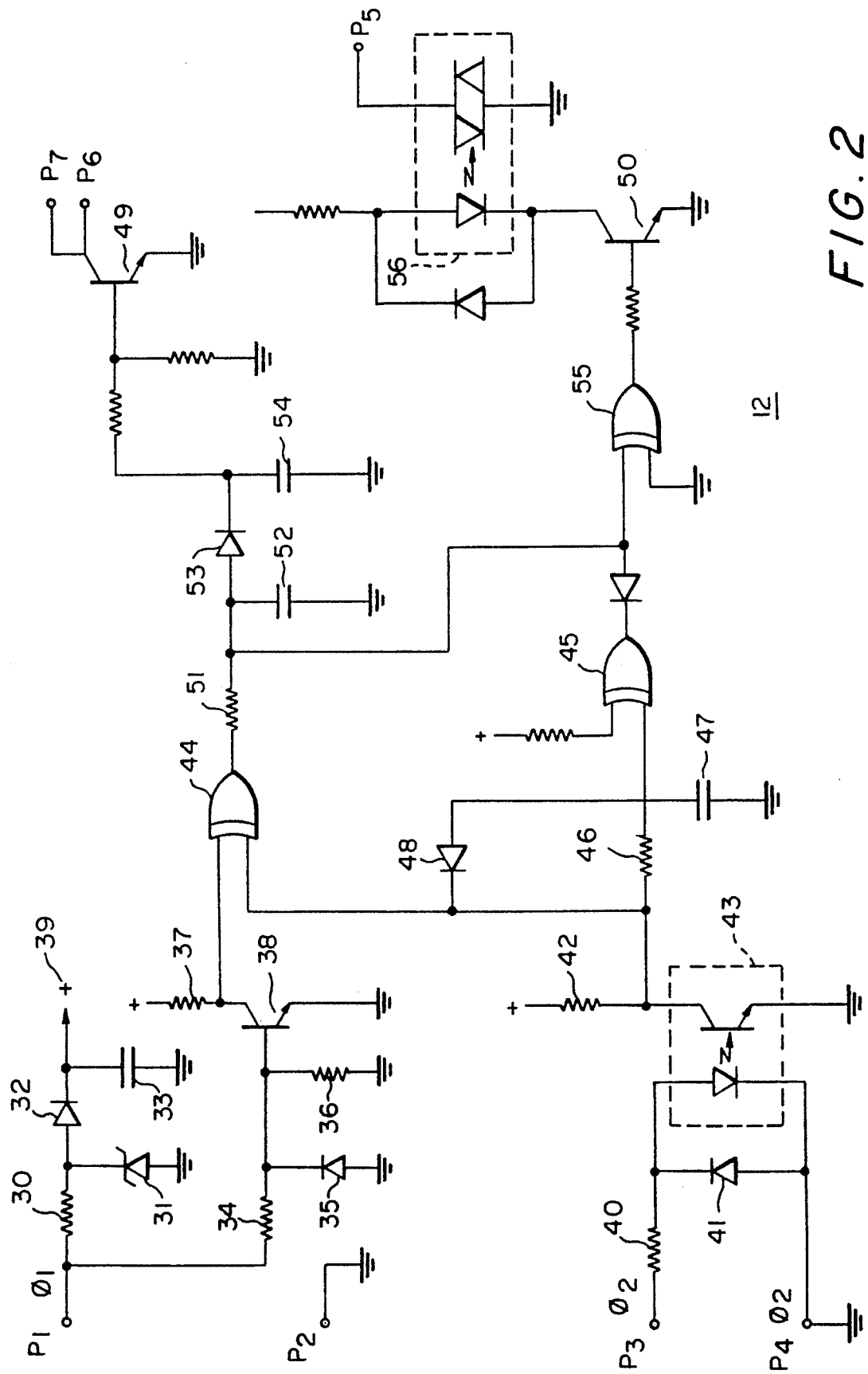
FIG. 2, is a schematic diagram of the phase sensor board shown in FIG. 1.

FIG. 2 shows the phase sensing and control board 12. Pins p1 through p7 are the same as those shown in FIG. 1. The phase sensing and determination of the out of phase condition between phase 1 and 2 supply lines is provided by the connections to pins 1 and 3. The positive voltage supply for board 12 is provided by resister 30, Ziener diode 31, diode 32, and capacitor 33.

The voltage from the phase 1 circuit is applied to resistor 34, diode 35, resistor 36 through transistor 38 and resistor 37 to form a level shifter and inverter. The out put of the collector of transistor 38 is a square wave at the positive potential 39 which is 180 degrees out of phase with the phase of line 1.

The resistor 40, diode 41 and resistor 42 form a second level shifter and inverter. The output on the collector of the opto-coupled device 43 is a 9 volt square wave 180 degrees out of phase with the phase 2 input.

Exclusive OR gate 44 compares the phasing between phase 1 and phase 2 inputs. When they are out of phase, the output of gate 44 is high, and when they are in phase, the output of gate 44 is low.

Exclusive OR gate 45 is used to detect the presence or absence of an input at phase 2 regardless of phase at phase 2. If there is an input present on phase 2, then the output of OR gate 45 will go high. If there is no input from phase 2, the output of OR gate 45 will be low. The filter formed by resister 46, capacitor 47 and diode 48 form the input for OR gate 45. If there is an input present at phase 2, the square way at the output of opto coupled device 43 keeps the capacitor 47 discharged and the input of gate 45 is held low. If there is no input present at phase 2, the output of opto-coupled device 43 is high and capacitor 47 will charge to a high value.

When the two inputs, phase 1 and phase 2 are out of phase, gates 44 and 45 are both high. These two high signals will turn on transistors 49 and 50. Resistor 51 and capacitor 52 combine to form a low pass filter which is used to filter the spikes occurring at the output of gate 44 due to the difference in delays between the two input circuits. The output of the low pass filter respect to a peek detector formed by diode 53 and capacitor 54. The output of this peak detector provides for base current to turn on transistor 49. Also, at the same time the output of the low pass filter is fed to an input of exclusive OR gate 55 which causes the output of gate 55 to go high. This provides the base current to turn on transistor 50.

If the input signal at phase 1 and phase 2 are in phase, the output of gate 44 is low and there is no current to drive the base of transistor 49 and it is turned off. Simultaneously, a low at the input of gate 55 causes its output to be low which turns transistor 50 off.

If a phase 2 input is not present then the input to gate 45 from opto-coupled device 43 is high and the output of gate 45 is held low. This keeps the input to gate 55 low which keeps both transistors 49 and 50 off.

In summary, if the inputs are in phase, both transistors 49 and 50 are turned off. If the inputs are not in phase and there is an input at phase 2, then transistors 49 and 50 are turned on. If there is no phase 2 voltage present, then transistors 49 and 50 are turned off.

The output of opto-coupled device 56 at p5 is connected to the red light 21 associated with by pass 20. Therefore, light 21 only comes on when opto coupled device 56 is turned on by transistor 50. For this reason, the red light 21 is only turned on when by pass switch 20 is turned to the by pass position and when the voltages at lines 1 and 2 are out of phase.

The collector of transistor 49 is connected to both pin 6 and pin 7. When pin 6 is clamped to ground, a path from the controller 15 to ground is established through switch 2, resistors 15a, 17a and 18a and to pin 6 and then to ground through transistor 49.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. An apparatus for prevention of overloading of a two-wire circuit of a three-wire electrical system comprising in combination:
   a first voltage supply line and a second voltage supply line;
   a first load and a second load, wherein said first load is connected to said first voltage supply line;
   means for sensing when said first and second voltage supply lines are out of phase;
   means responsive to said means for sensing for connecting said second load to said second voltage supply line when said first and second supply lines are out of phase; and
   a bypass switch means for bypassing said means for connecting said second load to a second voltage supply line, regardless of whether said first and second voltage supply lines are in or out of phase.

2. The apparatus in accordance with claim 1, further comprising means for indicating when said switch means for bypassing is open or closed when said first and second voltage supply lines are out of phase.

3. The apparatus in accordance with claim 1, further comprising means responsive to said means for sensing for supplying a voltage to an indicator when said first and second voltage supply lines are out of phase.

4. The apparatus in accordance with claim 1, further comprising an indicator lamp for signaling the presence of out-of-phase power on said first and second voltage supply lines.

5. The apparatus in accordance with claim 1, further comprising a first exclusive OR gate for comparing the phase of voltages on said first and second voltage supply lines, and providing an output if said voltages are out of phase.

6. The apparatus in accordance with claim 5, further comprising a switch means responsive to said first exclusive OR gate for turning on and off a load connected to one of said first and second voltage supply lines.

7. The apparatus in accordance with claim 5, further comprising a second exclusive OR gate for detecting the presence of a voltage on one of said first and second voltage supply lines,
   means responsive to said second exclusive OR gate and to said fist exclusive OR gate for providing an indication that a voltage is present on said second voltage supply line, and that the voltages on said first and second voltage supply lines are out of phase.

8. An apparatus for connecting a second load to a second circuit when said second circuit is out of phase with a first circuit having a first load comprising in combination:
   means for sensing the phase of said first and second circuits:
   means for automatically connecting said second load to said second circuit when said first and second circuits are out of phase; and
   means for bypassing said means for sensing and for connecting said second load when said first and second circuits are in phase or out of phase.

9. The apparatus in accordance with claim 8, further comprising means responsive to said means for sensing, for comparing the phases of said first and second circuits, and means for producing a signal when said first and second circuits are out of phase.

10. The apparatus in accordance with claim 8, further comprising means for indicating when said first and second circuits are out of phase.

11. The apparatus in accordance with claim 8, further comprising means for indicating when said first load and said second load are respectively connected to said first and second circuits having different phases.

12. The apparatus in accordance with claim 8, further comprising means for indicating when said first and second circuits are out of phase and when said load is connected to said second circuit.

13. The apparatus in accordance with claim 8, further comprising manual switch means for preventing automatically connecting said second load to said second circuit when said first and second circuits are out of phase.

* * * * *